United States Patent
Chenillo et al.

(10) Patent No.: US 9,621,929 B1
(45) Date of Patent: Apr. 11, 2017

(54) METHOD OF VIDEO CONTENT SELECTION AND DISPLAY

(71) Applicants: Samuel Chenillo, New York, NY (US); Roy Rosser, Monmouth Junction, NJ (US)

(72) Inventors: Samuel Chenillo, New York, NY (US); Roy Rosser, Monmouth Junction, NJ (US)

(*) Notice: Subject to any disclaimer, the term of this patent is extended or adjusted under 35 U.S.C. 154(b) by 0 days.

(21) Appl. No.: 15/216,961

(22) Filed: Jul. 22, 2016

(51) Int. Cl.
| | |
|---|---|
| *H04N 21/234* | (2011.01) |
| *H04N 21/2343* | (2011.01) |
| *H04N 21/235* | (2011.01) |
| *H04N 21/43* | (2011.01) |
| *H04N 21/442* | (2011.01) |
| *H04N 21/462* | (2011.01) |
| *H04N 21/233* | (2011.01) |
| *H04N 21/81* | (2011.01) |
| *H04N 21/262* | (2011.01) |
| *H04N 21/2665* | (2011.01) |

(52) U.S. Cl.
CPC ..... *H04N 21/23424* (2013.01); *H04N 21/233* (2013.01); *H04N 21/23418* (2013.01); *H04N 21/2625* (2013.01); *H04N 21/2665* (2013.01); *H04N 21/812* (2013.01)

(58) Field of Classification Search
None
See application file for complete search history.

(56) References Cited

U.S. PATENT DOCUMENTS

| 4,918,531 A | 4/1990 | Johnson | |
|---|---|---|---|
| 8,249,497 B2 | 8/2012 | Ingrassia | |
| 2002/0194593 A1 | 12/2002 | Tsuchida et al. | |
| 2002/0194595 A1* | 12/2002 | Miller | H04H 20/10 725/36 |
| 2004/0237102 A1* | 11/2004 | Konig | G06Q 30/02 725/36 |
| 2006/0251328 A1* | 11/2006 | Boo | G06K 9/00711 382/220 |
| 2010/0153993 A1* | 6/2010 | Konig | G06F 17/30802 725/34 |
| 2011/0191801 A1* | 8/2011 | Vytheeswaran | H04N 7/10 725/34 |

(Continued)

*Primary Examiner* — Brian T Pendleton
*Assistant Examiner* — Jean D Saint Cyr
(74) *Attorney, Agent, or Firm* — r.r (princeton); Roy Rosser

(57) ABSTRACT

A method of automated content selection is disclosed, in which an end user views multimedia content provided via by a content aggregator that is also programmed to detect content delivery boundaries. This occurs, for instance, when the provider switches from showing an event to showing interstitial advertising. On detecting a delivery boundary, a substitute stream of multimedia content is then automatically sent. Detecting a content delivery boundary is accomplished in a twostep process. First, a candidate frame indicative of a deliver boundary is found. This is done, for instance, by finding a change in average sound volume of sufficient magnitude. The candidate frame is then compared to a database of representative frames of known interstitial video segments. If a sufficiently good match is found, the frame is determined to be a content boundary frame, and appropriate switching of the video being relayed is made.

13 Claims, 3 Drawing Sheets

(56) References Cited

U.S. PATENT DOCUMENTS

2012/0117584 A1* 5/2012 Gordon ............... H04N 21/254
                                                                725/19
2015/0067722 A1    3/2015   Bjordammen et al.

\* cited by examiner

METHOD OF VIDEO CONTENT SELECTION AND DISPLAY

BACKGROUND OF THE INVENTION (1) Field of the Invention

This invention relates to the use of electricity in the form of electronic communications, and more particularly to arrangements for the broadcast or distribution of information in an electronic medium, and most particularly to systems that substitute or switch distributed information in real-time at the time of the broadcast, or distribution, of the content or information.

(2) Description of the Related Art

The technical problem of substituting broadcast content on detecting a change in the nature or origin of the content is inherent in the technical field of electronic broadcast communications.

In the United States, for instance, television broadcasting has largely embraced a business model in which events or programs being broadcast are routinely interrupted to insert paid for, interstitial advertising. When such advertising is inappropriate for the venue in which the broadcast is being viewed or shown, it is desirable to have a system that automatically detects a content break indicative of change in the broadcast from the event content to interstitial advertising, and to then automatically provide a substitute stream of content for the duration of the interstitial advertising. That substitute content may, for instance, be more appropriate advertising, or some alternate content that may be prerecorded and may, for instance, provide further information related to the event of program that is being interrupted.

The relevant prior art includes:

US Patent Application no. 20020194593 published by Ted Tsuchida et al. on Dec. 19, 2002 entitled "Method of substituting content during program breaks" that describes a method of substituting content during a program break, and includes: detecting a break in a broadcast program, and in response to the break, showing substitute content. A method of substituting broadcast content displayed on a screen, includes: determining an occurrence of a break in a broadcast content; and in response to the occurrence of the break, displaying substitute content on the screen. The method may further include: displaying the broadcast content when the break terminates.

U.S. Pat. No. 8,249,497 issued to Ingrassia et al. on Aug. 21, 2012 entitled "Seamless switching between radio and local media" that describes systems and methods for seamlessly switching media playback between a media broadcast, such as a radio broadcast, and media from a local media library. When an electronic device determines that an upcoming media item in a media broadcast is not of interest to a user, the electronic device can switch playback from the media stream to a media item from the electronic device local library. The selected local media item can be related to a previously broadcast media item to ensure continuity in the user's listening or viewing experience. The electronic device can switch away from the local media item and return to the media stream when the media stream again broadcasts media items or segments of interest to the user.

U.S. Pat. No. 4,918,531 issued to Johnson on Apr. 17, 1990 entitled "Commercial message timer" that describes a commercial message timer, that when enabled by a user, stores data indicative of a first tuned station and begins timing a predetermined time period. Upon expiration of the time period, the first tuned station is automatically reselected if it had been deselected after the timer was enabled. In this way a user can avoid a commercial message on a first channel by setting the timer and scanning through other channels, and yet have the receiver return automatically to the first channel at the end of a time period substantially equal to that of a typical commercial message. In another embodiment employing PIX-IN-PIX circuitry, the subject apparatus is responsive to the sequence of (1) enabling the timer and (2) changing channels for automatically moving the desired channel to the insert position. In response to the expiration of the timer period, the program displayed in the insert position is automatically returned to the main display position.

US Patent Application no. 20150067722 published by David M. Bjordammen et al. on Mar. 5, 2015 entitled "Averting Ad Skipping in Adaptive Bit Rate" that describes an adaptive bit rate system that uses adaptive streaming to deliver content to client devices capable of adaptive bit rate streaming. Techniques for averting or inhibiting ad skipping by an adaptive bit rate client device that receives media chunks from the adaptive bit rate system may include techniques for both live content and on demand content. Techniques include modifying a buffer size for access to trick plays and/or constructing a manifest file with limited content based on ad breaks.

Various implementations are known in the art, but fail to address all of the problems solved by the invention described herein. Various embodiments of this invention are illustrated in the accompanying drawings and will be described in more detail herein below.

BRIEF SUMMARY OF THE INVENTION

An inventive system and method of automated video content selection and display is disclosed.

In a preferred embodiment, an end user may view stream of digital multimedia content on their display device. That content may, for instance, be obtained from a first source of digital multimedia content via a first content provider that may, for instance, be broadcasting the material via routes such as, but not limited to, terrestrial broadcasting stations, satellite broadcasting stations or digital communications networks such as a cable TV network, or the Internet, or some combination thereof.

The end user may select the content they are watching by using a digital processor programmed to act as a content aggregator. The content aggregator may be a set-top box, and may also be programmed to detect content delivery boundaries. A content delivery boundary may, for instance, occur when the content provider switches from providing content from a first source of digital multimedia content to content from a second source of digital multimedia content. This may, for instance, occur when the content provider switches from showing content from an event, or a studio or theater production, to showing interstitial advertising.

In a preferred embodiment of the present invention, content boundaries may be detected in a two-stage process.

In the first stage, a candidate video frame may be obtained by, for instance, detecting a change indicative of a content boundary between the candidate frame and a one or more preceding video frames in the video stream being monitored. A change indicative of a content boundary may, for instance, be a change such as, but not limited to, a change in the audio level, that exceeds a predetermined threshold, between the candidate frame and one or more preceding video frames. That and other methods of obtaining candidate frames are described in greater detail below.

In the second stage, having automatically found a candidate video frame, this may then be compared against a database of the video content of representative frames of known interstitial video segments. This database by be precompiled either by human observers, or it may be compiled and/or augmented by automated pattern recognition techniques. If the match between the candidate video frame and one of the representative frames is found that is greater than a predetermined match-threshold, the candidate video frame may then automatically be designated as a content delivery boundary frame indicative of a content boundary.

In a preferred embodiment of the present invention, the content aggregator may, on detecting such a content delivery boundary, now provide the end user with a substitute stream of digital multimedia content from a second content provider. This substitute stream of digital multimedia content may, for instance, be material such as, but not limited to, alternate advertising content, or prerecorded content of interest to the user, or some combination thereof.

The content aggregator may later automatically detect a second content delivery boundary that may be indicative of the first content provider having returned to delivering multimedia from the first source of content, and the content aggregator may be programmed to then automatically return to delivering that content to the content consumer's display device.

Automatically detecting a candidate video frame may be accomplished by a number of methods such as, but not limited to, detecting a discontinuity in the Vertical Interval Time Code, a change of Station ID signal, a change in average sound volume, a change in either a horizontal position or a vertical frame position, an occurrence of a black frame, or some combination thereof. In order to perform the analysis necessary to detect a content boundary, there may need to be a delay in delivering content to the end user, i.e., the content aggregator, or set-top box, may need to store and delay the flow of content for one to five seconds so that there is time for the programmed digital processor to perform the appropriate analysis.

Therefore, the present invention succeeds in conferring the following, and others not mentioned, desirable and useful benefits and objectives.

It is an object of the present invention to provide an automated means of detecting a change in the origination of video content, and switching to alternate video content when that change occurs.

It is another object of the present invention to provide an effective method of switching out advertising content for alternative content.

DETAILED DESCRIPTION OF THE INVENTION

Figure 1:
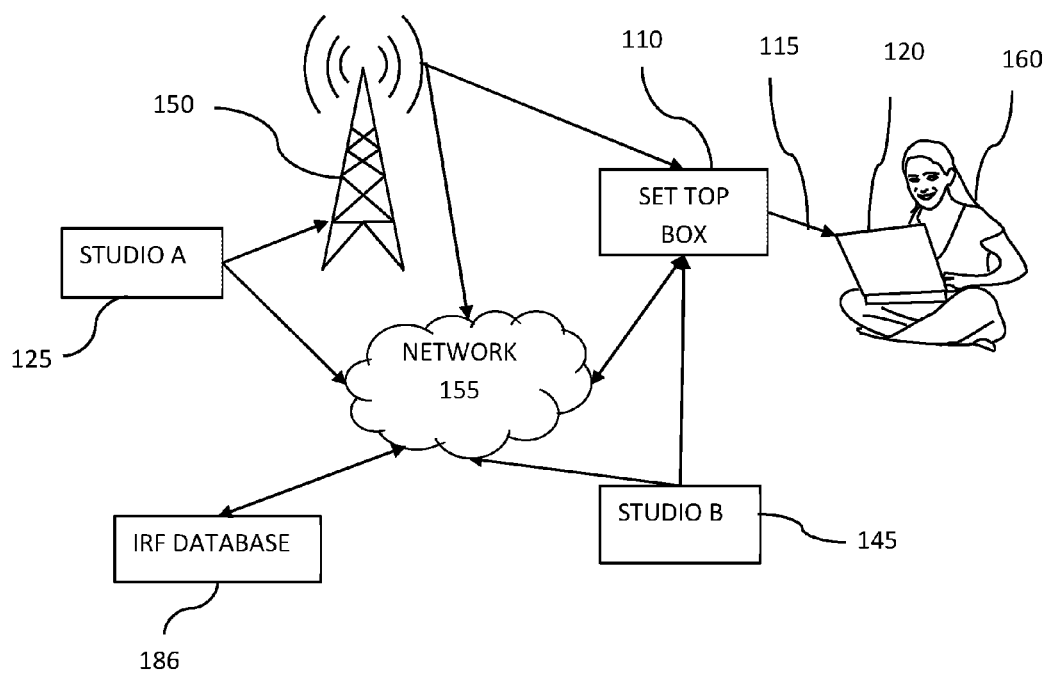
FIG. 1 shows a schematic outline of a method of video content selection and display of one embodiment of the present invention.

The preferred embodiments of the present invention will now be described in more detail with reference to the drawings in which identical elements in the various figures are, as far as possible, identified with the same reference numerals. These embodiments are provided by way of explanation of the present invention, which is not, however, intended to be limited thereto. Those of ordinary skill in the art may appreciate upon reading the present specification and viewing the present drawings that various modifications and variations may be made thereto.

FIG. 1 shows a schematic outline of a method of video content selection and display of one embodiment of the present invention.

An end user 160 is represented in FIG. 1 as receiving a stream of digital multimedia content 115 on their content consumer's display device 120. The stream of digital multimedia content 115 may be relayed to them via a programmed digital processor 110 that may, for instance, be a set-top box or other content aggregator. The programmed digital processor 110 may, for instance, initially be receiving digital content from a first content provider 125 via a distribution chain that may include elements such as, but not limited to, broadcast transmission facility 150, a digital communications network 155 or some combination thereof.

At some point in time, the programmed digital processor 110 may automatically detect a change in a source, or type, of content being received from first content provider 125 and may automatically switch to delivering content from a second content provider 145 to the content consumer's display device 120 that may be of a different type.

This change in content may, for instance, be indicative of the first content provider 125 switching to providing interstitial advertising content, at which point in time, the programmed digital processor 110 may be preprogrammed to deliver substitute content from the second content provider 145.

The change in content type that may be most desirable to detect may be the switching from event from an event to an interstitial commercial.

In a preferred embodiment, such a change of content may be determined by, for instance, detecting content boundaries in a two-stage process.

In the first stage, a candidate video frame may be obtained by, for instance, detecting a change indicative of a content boundary between the candidate frame and a one or more preceding video frames in the video stream being monitored. A change indicative of a content boundary may, for instance, be a change such as, but not limited to, a change in the audio level, that exceeds a predetermined threshold, between the candidate frame and one or more preceding video frames. That and other methods of obtaining candidate frames are described in greater detail below.

In the second stage, having automatically found a candidate video frame, this may then be compared against a database 186 of video content of representative frames of known interstitial video segments. This database 186 by be precompiled either by human observers, or it may be compiled and/or augmented completely, or in part, by automated pattern recognition techniques, and may either be located at, or as part of, the programmed digital processor 110, or it may be located remotely and all, or part, of its content accessed via a digital communications network 155.

If the match between the candidate video frame and one of the representative frames is found that is greater than a predetermined match-threshold, the candidate video frame to be then automatically designated to be a content delivery boundary frame indicative of a content boundary.

The programmed digital processor 110 may, for instance, have, or be associated with, a digital storage memory capable of storing one or more streams of digital multimedia content for a short period of time that may be as short as one second or as long as five seconds. This content storage may be necessary in order to allow time for the programmed digital processor 110 to perform the necessary analysis to determine the occurrence of content delivery boundaries.

Figure 2:
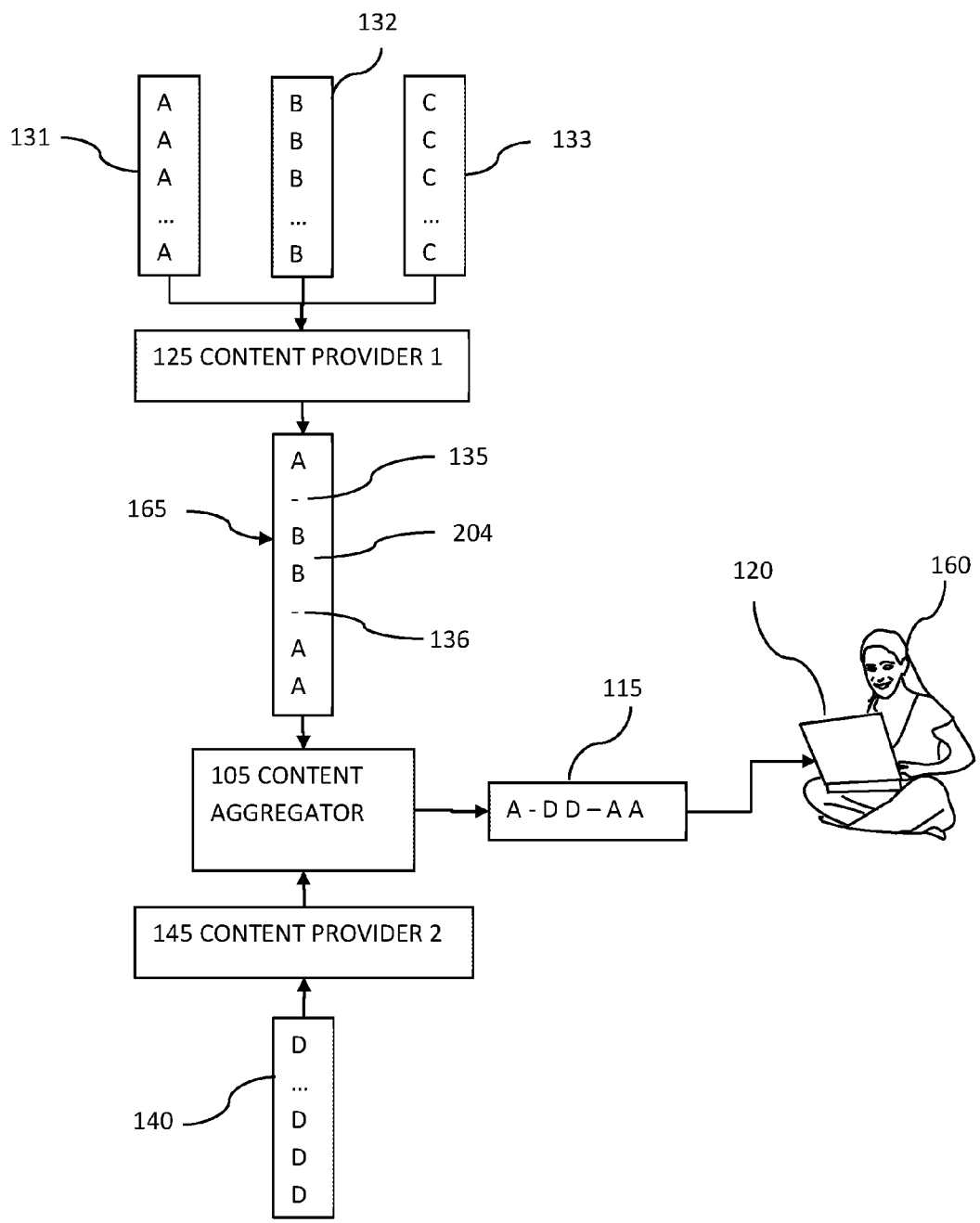
FIG. 2 shows a schematic outline of a method of video content selection and display of a preferred embodiment of the present invention.

FIG. 2 shows a schematic outline of a method of video content selection and display of a preferred embodiment of the present invention.

The end user 160 may be receiving stream of digital multimedia content 115 on their content consumer's display device 120 that may, for instance, be any suitable electronic hardware such as, but not limited to, a television set, a laptop computer, a smart phone or some combination thereof.

The stream of digital multimedia content 115 being viewed may be provided to the content consumer's display device 120 from one or more content providers 125 via a content aggregator 105. The content aggregator 105 may, for instance, be a set-top box containing a programmed digital processor, or any other suitable combination of hardware and software that may be programmed to perform functions such as, but not limited to, switching to specific media sources at specific times, recording specific media sources at specific times, identifying the source or nature of media sources and/or media content streams, relaying media content sources with, or without delays that may vary from one to five seconds, or some combination thereof.

As shown in FIG. 2, the content aggregator 105 may receive a consolidated steam of digital multimedia content 165 from one or more content providers. A first content provider 125 may for instance provide a consolidated steam of digital multimedia content 165 made up of from a variety of sources of digital multimedia content.

The representative example of FIG. 2, for instance, shows a first content provider 125 providing content from three sources, i.e., first source of digital multimedia content 131, a second source of digital multimedia content 132, and a third source of digital multimedia content 133. The content of each of these sources is represented in FIG. 2 as a series of capital letters, A, B, and C. This allows the consolidated steam of digital multimedia content 165 being delivered from the first content provider 125 to the content aggregator 105 to be shown as a combination of content originating with first source of digital multimedia content 131 and second source of digital multimedia content 132. In such a mixed stream of content there may be content delivery boundaries, as illustrated by first content delivery boundary 135 and a second content delivery boundary 136.

In a preferred embodiment, the first content delivery boundary 135 and second content delivery boundary 136 may surround one or more interstitial video segments 204.

The content aggregator 105 may, however, be programmed to detect a content delivery boundary indicative of the content source being switched from the first source of digital multimedia content 131 to the second source of digital multimedia content 132, and may be programmed to then substitute content from a second content provider 145 that may be providing a substitute stream of digital multimedia content 140.

The combined stream of digital multimedia content 115 may then be delivered from the content aggregator 105 to the end user 160 via the content consumer's display device 120.

As detailed about, detection of a content delivery boundary may be done in two stages.

In the first stage, a candidate video frame may be obtained by, for instance, automatically detecting a change indicative of a content boundary, that may, for instance, be, but is not limited to, a change in an audio level exceeding a predetermined level.

In the second stage, having automatically found a candidate video frame, this frame may then be compared against a database of representative video frames of known interstitial video segments.

If a sufficiently good match is found between the candidate video frame and one of the representative frames, the candidate video frame may then automatically be designated to be a content delivery boundary frame indicative of a content boundary.

As shown in FIG. 2, on detecting the first content delivery boundary 135, the content aggregator 105 may switch from providing content from the second source of digital multimedia content 132 to providing a substitute stream of digital multimedia content 140.

In a preferred embodiment of the present invention, at a first predetermined time after reporting the first content delivery boundary frame, the system may perform further analysis of the digital multimedia content from the first content provider for a second predetermined time. The system may then automatically take an action dependent on that analysis.

If a next candidate frame is not found during that analysis, the system may, for instance, resume relaying digital multimedia content from the first content source that may be provided by the first source of digital multimedia content.

If, however, during that analysis, a next candidate frame is found, and that next candidate frame is a determined to be a next content delivery boundary by matching with the database of representative frames of known interstitial video segments, the system may automatically elect continue to relay the substitute digital multimedia content provided by said second content provider to the content consumer's display device.

If, however, during the analysis, a next candidate frame is found, but that next candidate frame is determined not to be a next content delivery boundary, the system may automatically elect to resume relaying digital multimedia content from the first content source provided by the first source of digital multimedia content to the content consumer's display device. In such a case, the system may also elect to record a representative sample of the digital multimedia content from the first content source that may be contiguous with the next candidate frame that was not matched. This representative sample may be stored along with the unmatched next candidate frame. This storage may, for instance, be in a special location of the interstitial video segment database that may, for instance, be a candidate interstitial video segment database.

The contents of such a candidate interstitial video segment database may be examined by a human operator, either in real time or at a later time. The human operator may, for instance, determine whether the representative sample is part of an interstitial video segment that may be likely to be shown again, and may then add Detecting a candidate video frame may be accomplished in a number of ways. The frame may, for instance, be automatically discovered by a change in the digital content being supplied by a finding of a change such as, but not limited to, a discontinuity in the Vertical Interval Time Code (VTIC), a change of Station ID signal, a change in average sound volume, a change in either a horizontal position or a vertical frame position, an occurrence of a black frame or some combination thereof.

Detecting a candidate video frame may, for instance, be accomplished by detecting a discontinuity in the Vertical Interval Time Code (VITC) of more than 1 second between contiguous video frames.

Alternately, or in combination, detecting a candidate video frame may be accomplished by detecting using pattern recognition, a change of Station ID signal from a first Station ID signal to a second station ID signal.

Alternately, or in combination, a candidate video frame may be accomplished by detecting a change in average sound volume of over 5 decibels over a five-second time interval.

Alternately, or in combination, detecting a candidate video frame may be accomplished by detecting a change in either a horizontal position or a vertical frame position of greater than 1 pixel.

Alternately, or in combination, detecting a candidate video frame may be accomplished by detecting one or more black video frames.

Alternately, or in combination, detecting a candidate video frame may be accomplished by receiving a vote above a predetermined amount from an algorithm combining a weighted combination from at least two indicators of change selected from group consisting of a discontinuity in the Vertical Interval Time Code, a change of Station ID signal, a change in average sound volume, a change in either a horizontal position or a vertical frame position, and an occurrence of a black frame.

In a preferred embodiment of the present invention, the content aggregator 105 may incorporate a content delay module that may allow streams of digital multimedia content to be temporarily stored for from one to five seconds before being relayed on to the content consumer's display device 120. This temporary storage may, for instance, allow the content aggregator 105 time for the processing of content to determine if a content delivery boundary is present. This may be of particular use in determining instances such as, but not limited to, the occurrence of a change in an average audio level before and after a content delivery boundary frame.

Figure 3:
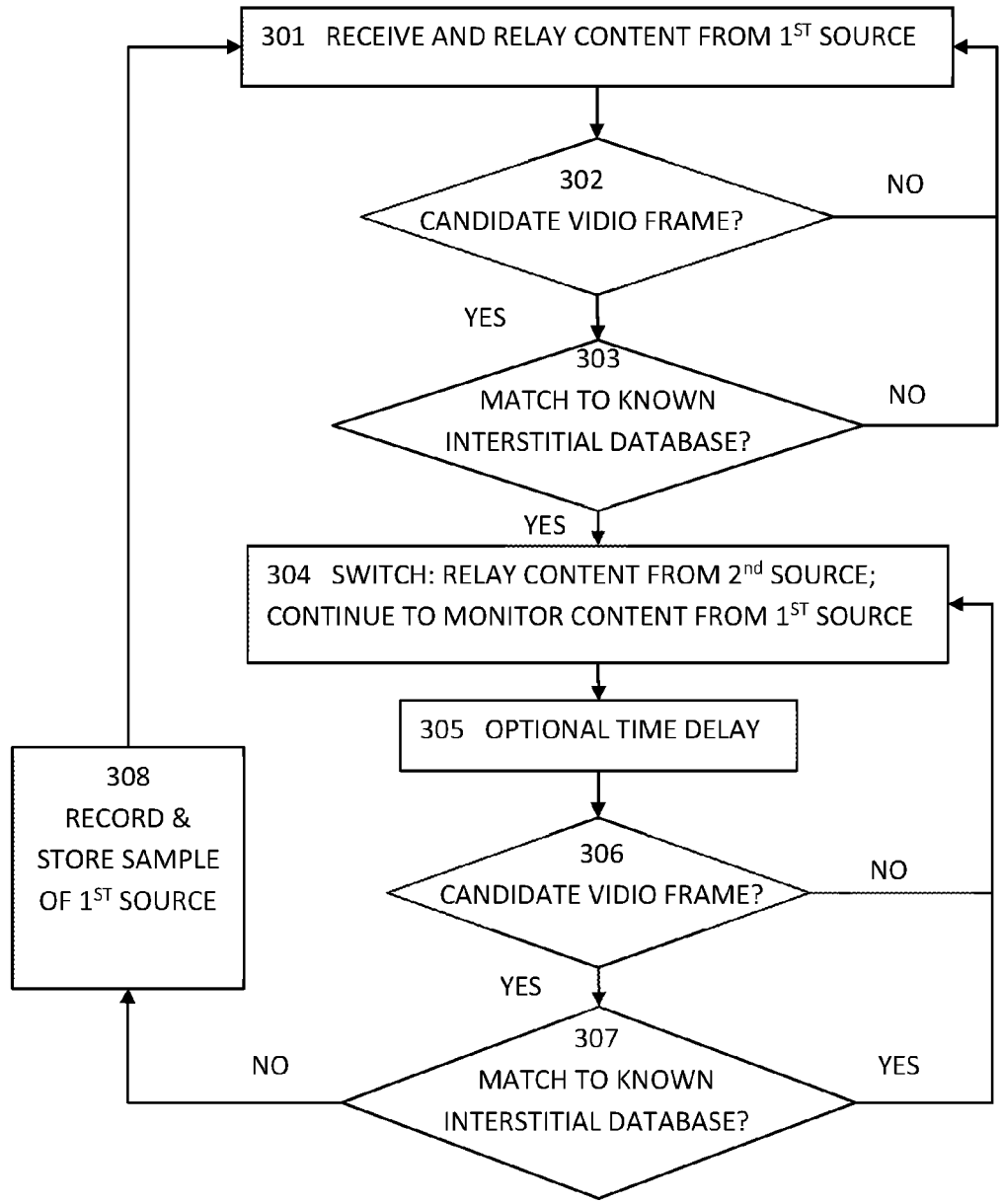
FIG. 3 shows a schematic flow diagram of representative steps for a method of video content selection and display of a preferred embodiment of the present invention.

FIG. 3 shows a schematic flow diagram of representative steps for a method of video content selection and display, of a preferred embodiment of the present invention.

In Step 301: "Receive and Relay Content from 1st Source" an end user may receive a stream of digital multimedia content from a $1^{st}$ content source, and view and/hear that content using a display device that may incorporate systems for features such as, but not limited to, the capability to display images, play audio, receive text, or other user input, or some combination thereof. This stream of digital multimedia content may be relayed from a first content provider to the content consumer's display device via a content aggregator that may, for instance, be a set-top box device having a programmed digital processor. A programmed digital processor on the content aggregator may monitor the content from the $1^{st}$ source of content for candidate video frames. The content aggregator may also have the capability of temporarily storing and delaying the relay of the video on so as to allow appropriate analysis of video to performed for the detection of a candidate video frame.

In Step 302: "Candidate Video Frame?" the content aggregator supplying the content consumer's display device with the stream of digital multimedia content may detect a candidate video frame. The candidate video frame may, for instance, be a video frame in which there may be some change from one or more preceding video frames that may be indicative of a content boundary, i.e., that the content may now be coming from a different source, or that the content is now of a different type, i.e., that it may now, for instance, be an interstitial commercial or other promotional material rather than the event or program that was previously being delivered. Such a candidate video frame may, for instance, be detected by one or other of the methods described above, such as, but not limited to, detecting a change greater than 4 db of an average audio level of the digital multimedia content between the candidate frame and an averaged audio level of one or more preceding video frames, receiving a vote above a predetermined amount from an algorithm combining a weighted combination from at least two indicators of change selected from group consisting of a discontinuity in the Vertical Interval Time Code, a change of Station ID signal, a change in average sound volume, a change in either a horizontal position or a vertical frame position, and an occurrence of a black frame, or some combination thereof.

If a candidate video frame is not found, the system may loop back to Step 301 and continue to receive content from the $1^{st}$ source and relay it on to the end user's display device while continuing to monitor the content for a candidate video frame.

If a candidate video frame is found, the system may continue on to Step 303.

In Step 303: "Match to Known Interstitial Database?" the candidate video frame may be compared to a database of representative frames of known interstitial video segments. These known interstitial video segments may, for instance, be video adverts that are known to occur regularly during the content being delivered by the first content provider. The database may, for instance, contain one or more or the video frames of these known interstitial video segments. The database may also include generic video frames that may be indicative of the beginning of an interstitial video segment such as, but not limited to, a black video frame. In a preferred embodiment of the present invention, the comparison between the candidate video frame and the representative frames may be performed on all or part of the video component of the frames, or on some suitably filtered down, or reduced size, version of each, such as, but not limited to, a thumbnail image. The database may, for instance, contain a range of size reductions of each frame of the representative frames so that a quick search may be down on the smallest size, and then if a sufficient match is found, a further confirmatory search may be done on a larger size, higher resolution version to obtain greater confidence in the match or lack of match. The criteria for determining if a match has been found may contain a predetermined threshold such as, but not limited to, having the pixel values of 90% or more of spatially corresponding pixels in same-sized images match to within 5% of each other. The database may be located remotely from the content aggregator and accessed via a digital communications network, or it may be stored completely or in part at the content aggregator. The database may have a limited number of representative frames, such as but limited to, 100 frames, or 1000 frames, and they may be stored and/or compared, in the order in which they were last seen on this particular source of content, or in the order in which they were added to the database, or some combination thereof.

If there is no sufficiently good match of the candidate video frame to one of the representative interstitial frames, the system may loop back to Step 301 and continue to receive content from the 1st source and relay it on to the end user's display device while continuing to monitor the content for a candidate video frame.

If there is a match that exceeds some predetermined threshold, the system may automatically more on to Step 304.

In Step 304: "Switch: Relay Content from 2nd Source; Continue to Monitor Content from 1st Source", the system may automatically switch to now relaying content from a second source to the content consumer's display device, while continuing to monitor content from the first source. This scenario may, for instance, be representative of the situation in which a user has been watching an event, or program, and the distributor of that content is now switching to displaying an interstitial commercial. Instead of watching that commercial, the content aggregator may instead provide the end user with alternate content that may, for instance, be prerecorded content, or may be related, or relevant, content supplied by a second content provider. This alternate content may, for instance, be content such as, but not limited to, more appropriate advertising, additional information related to the event that was being watched, information about related events, or some combination thereof.

Having switched to a relaying substitute stream of digital multimedia content to the end user, the content aggregator may continue to monitor the $1^{st}$ source of content for further candidate video frames.

The system may then proceed to Step 305: "Optional Time Delay". Because the content from the $1^{st}$ source may now be an interstitial commercial, and interstitial commercials tend to be of a fixed length, typically thirty or sixty-seconds, though some are only fifteen-seconds in length, one way to reduce the computational burden on the programmed digital processor may be to delay monitoring for a set time, then resume it. To allow for possible variation in delivery time delays, the delay may be for slightly less than the anticipated length of the known interstitial video, and the system may therefore resume monitoring after twenty-nine seconds and then monitor for five-seconds before resting again, this time for twenty-four seconds to account for the five-seconds of monitoring.

If in Step 306: "Candidate Video Frame?" a next candidate frame is not found, then the system may loop back to Step 304 and continue to relay the substitute stream of digital multimedia content from the $2^{nd}$ source of content to the end user, while continuing to monitor the 1st source of content for further candidate video frames.

If, however, a candidate video frame is found, the system may automatically proceed to Step 307: "Match to Known Interstitial Database?". The same procedure for attempting to find a match between the candidate video frame and one of the representative frames in the database of known interstitial video segments as described above for Step 303 may be used. If a sufficiently good match is made, the system may automatically return to Step 304 and continue to relay content from the second source to the content consumer's display device, while continuing to monitor content from the first source. This may, for instance, represent the situation in which several known interstitial video segments are being shown in a contiguous sequence.

However, if no sufficiently good match is made, the content from source 1 may now be either an unknown interstitial video segment, or it may be a return to the event or program that was originally being watched. The system may now return to Step 301 and return to relaying content from a first content provider to the content consumer's display device while monitoring that content for candidate video frames.

However, since the system is uncertain if the content now being shown is the original programming, or some new interstitial video content, the system may first go through Step 308: "Record & Store Sample of 1st Source". In this step, the system may store a representative sample of the digital multimedia content supplied by the $1^{st}$ source in the time immediately following the unmatched candidate video frame. This representative sample, which may be as little as one-second or as long as ten-seconds, may then be stored along with the unmatched candidate video frame for real-time, or later, review by a human operator to determine if it is a new interstitial video segment. If it is determined to be a new interstitial video segment, a determination may also be made by the human operator as to whether it is worth adding to the database of video content of representative frames of known interstitial video segments. In this way, the database may be augmented and/or updated.

In this manner, the end user may, for instance, be watch an event without being subject to interstitial commercials, or may, at least, only view interstitial commercial that may have relevance to them.

Although this invention has been described with a certain degree of particularity, it is to be understood that the present disclosure has been made only by way of illustration and that numerous changes in the details of construction and arrangement of parts may be resorted to without departing from the spirit and the scope of the invention.

The invention claimed is:

1. A method of video content selection and display, comprising:

relaying, using a content aggregator, comprising a programmed digital processor, a stream of digital multimedia content to a content consumer's display device, said digital multimedia content being provided by a first content provider from a first source of digital multimedia content;

automatically detecting, by said programmed digital processor, while receiving said stream of digital multimedia content from said first content provider, a candidate video frame by detecting a change indicative of a content boundary between said candidate frame and a one or more preceding video frames;

automatically comparing, by said programmed digital processor, a video content of said candidate video frame to a database of video content of representative frames of known interstitial video segments, and if a match of said candidate frame to one of said representative frames is found that is greater than a predetermined match-threshold, automatically designating said candidate video frame to be a first content delivery boundary frame indicative of a change of origin of said digital multimedia content from said first source of digital multimedia content to a second source of digital multimedia content; and automatically switching, by said programmed digital processor after said designation of said first content deliver boundary, to relaying to said content consumer's display device a substitute stream of digital multimedia content provided by a second content provider from a second source of digital multimedia content; and further comprising:

at a first predetermined time after reporting said first content delivery boundary frame, performing a further analysis of digital multimedia content from said first content provider for a second predetermined time, and taking an action dependent on said analysis, said action comprising one of:

if a next candidate frame is not found, resuming relaying digital multimedia content from said first content source provided by said first source of digital multimedia content to said content consumer's display device;

if said next candidate frame is found, and said next candidate frame is a determined to be a next content delivery boundary by matching with said database of representative frames of known interstitial video segments, continuing to relay to said content consumer's display device said substitute digital multimedia content provided by said, second content provider; and if said next candidate frame is found, but said next candidate frame is determined not to be said next content delivery boundary, resuming relaying digital multimedia content from said first content source provided by said first source of digital multimedia content to said content consumer's display device, and recording a representative sample of said digital multimedia content from said first content source contiguous with said next candidate frame and storing said representative sample and said next candidate frame in a candidate interstitial video segment database.

2. The method of claim 1, wherein detecting said candidate video frame comprises detecting a change greater than 4 db of an average audio level of said digital multimedia content between said candidate frame and an averaged audio level of one or more preceding video frames.

3. The method of claim 2, wherein first predetermined time is 29 seconds and said second predetermined time is 5 seconds.

4. The method of claim 3, further comprising: reviewing, by a human operator, said representative sample stored in said candidate interstitial video segment database and electing to add said next candidate frame to said database of representative frames of known interstitial video segments if said human operator determines said representative sample constitutes a valid interstitial video segment.

5. The method of claim 4, further comprising: automatically limiting said database of representative frames of known interstitial video segments to a predetermined upper limit.

6. The method of claim 5, wherein said database of representative frames of known interstitial video segments is sorted in order of the most recently added, found or seen, and wherein the oldest representative frames are discarded when a new representative frame is added.

7. The method of claim 6, wherein said upper limit is 100.

8. The method of claim 1, wherein said detecting a detecting a change indicative of a content boundary between said candidate frame and a one or more preceding video frames further comprises detecting a discontinuity in the Vertical Interval Time Code (VITC) of more than 1 second between contiguous video frames.

9. The method of claim 1, wherein said detecting a detecting a change indicative of a content boundary between said candidate frame and a one or more preceding video frames further comprises detecting using pattern recognition, a change of Station ID signal from a first Station ID signal to a second station ID signal.

10. The method of claim 1, wherein said detecting a detecting a change indicative of a content boundary between said candidate frame and a one or more preceding video frames further comprises detecting a change in average sound volume of over 5 decibels over a five-second time interval.

11. The method of claim 1, wherein said detecting a detecting a change indicative of a content boundary between said candidate frame and a one or more preceding video frames further comprises detecting a change in either a horizontal position or a vertical frame position of greater than 1 pixel.

12. The method of claim 1, wherein said detecting a detecting a change indicative of a content boundary between said candidate frame and a one or more preceding video frames further comprises detecting one or more black video frames.

13. The method of claim 1, wherein said detecting a detecting a change indicative of a content boundary between said candidate frame and a one or more preceding video frames further comprises receiving a vote above a predetermined amount from an algorithm combining a weighted combination from at least two indicators of change selected from group consisting of a discontinuity in the Vertical Interval Time Code, a change of Station ID signal, a change in average sound volume, a change in either a horizontal position or a vertical frame position, and an occurrence of a black frame.

* * * * *